United States Patent [19]
Tabata et al.

[11] Patent Number: 6,030,590
[45] Date of Patent: Feb. 29, 2000

[54] REDUCTION PURIFICATION METHOD OF NITROGEN OXIDE-CONTAINING EXHAUST GAS

[75] Inventors: Mitsunori Tabata; Katsumi Miyamoto; Tomohiro Yoshinari; Kazuhito Sato; Sadao Takehara, all of Saitama, Japan

[73] Assignees: Cosmo Research Institute; Cosmo Oil Co., Ltd., both of Tokyo, Japan

[21] Appl. No.: 08/773,363

[22] Filed: Dec. 26, 1996

[30] Foreign Application Priority Data

Dec. 26, 1995 [JP] Japan ................................. 7-339402
Dec. 26, 1995 [JP] Japan ................................. 7-339403
Oct. 9, 1996 [JP] Japan ................................. 8-268928

[51] Int. Cl.$^7$ ............................ B01D 53/56; B01D 53/94
[52] U.S. Cl. ........................... 423/239.1; 423/213.2
[58] Field of Search ............................ 423/239.1, 213.5, 423/213.2

[56] References Cited

U.S. PATENT DOCUMENTS

| | | | |
|---|---|---|---|
| 3,840,471 | 10/1974 | Acres ................................... | 423/213.5 |
| 4,162,235 | 7/1979 | Acres et al. ........................... | 252/462 |
| 4,486,547 | 12/1984 | Imai et al. ............................. | 502/223 |
| 5,275,792 | 1/1994 | Obuchi e al. .......................... | 423/239.1 |

FOREIGN PATENT DOCUMENTS

| | | |
|---|---|---|
| 1 0519120 | 12/1992 | European Pat. Off. . |
| 1 0604987 | 7/1994 | European Pat. Off. . |
| 50-75971 | 6/1975 | Japan ................................. 423/239.1 |
| 62-254349 | 9/1992 | Japan . |
| 5-68855 | 3/1993 | Japan ................................. 423/239.1 |
| 60 071176 | 3/1994 | Japan . |
| 6-198173 | 7/1994 | Japan ................................. 423/239.1 |
| 62-234547 | 10/1997 | Japan . |
| WO 9205861 | 4/1992 | WIPO . |

*Primary Examiner*—Gary P. Straub
*Assistant Examiner*—Timothy C Vanoy
*Attorney, Agent, or Firm*—Sughrue, Mion, Zinn, Macpeak & Seas, PLLC

[57] ABSTRACT

A reduction purification method of a nitrogen oxide-containing exhaust gas by contacting said nitrogen oxide-containing exhaust gas with a catalyst in an oxidative atmosphere in which an excess amount of oxygen is present and in the presence of at least one reducing agent selected from the group consisting of a hydrocarbon and an oxygen-containing organic compound, wherein said catalyst comprises an alumina having supported thereon (a) tin and (b) at least one selected from the group consisting of ruthenium, palladium, rhodium and indium.

4 Claims, No Drawings

REDUCTION PURIFICATION METHOD OF NITROGEN OXIDE-CONTAINING EXHAUST GAS

FIELD OF THE INVENTION

The present invention relates to a method for purifying a nitrogen oxide-containing exhaust gas by treating the exhaust gas with a hydrocarbon or an oxygen-containing organic compound as a reducing agent in the presence of a catalyst in an oxidative atmosphere in which an excess amount of oxygen is present to catalytically reduce the nitrogen oxide. It also relates to a catalyst for catalytically reducing such a nitrogen oxide.

BACKGROUND OF THE INVENTION

Nitrogen oxides are included in various exhaust gases, and the nitrogen oxides can be not only the cause for generating photochemical smog and acid rain, but also directly adversely affect a human body. Therefore, various means have been conventionally proposed for eliminating nitrogen oxides in exhaust gases. In particular, a method wherein a nitrogen oxide-containing exhaust gas is contacted with a catalyst to reduce the nitrogen oxide has been already practically utilized in some field.

Examples of the method include (a) a method for treating nitrogen oxides in an exhaust gas from a gasoline engine of an automobile with a three-way catalyst, and (b) a method of a selectively catalytic reduction of nitrogen oxides in an exhaust gas from large scale facilities such as a boiler with ammonia as a reducing agent. Furthermore, recently there has been proposed (c) a method for treating nitrogen oxide-containing exhaust gases using a hydrocarbon as a reducing agent in the presence of a catalyst comprising a metal such as copper having supported thereon a metallic oxide such as alumina or a catalyst comprising various metals having supported thereon a zeolite (JP-A-63-100929 (the term "JP-A" as used herein means an "unexamined published Japanese patent application")).

In the above-described method (a), hydrocarbon components and carbon monoxide included in a combustion exhaust gas from a gasoline engine of an automobile are converted to water and carbon dioxide with a catalyst comprising a metal belonging to the platinum group and, at the same time, nitrogen oxides included in the exhaust gas are reduced to nitrogen. An exhaust gas is required to comprise an appropriate amount of oxygen so that nitrogen oxides may be effectively reduced under the reaction conditions. Thus, this method has a problem in that it cannot be used in principle in an atmosphere in which an excess amount of oxygen is present as in a diesel engine.

The method (b) uses ammonia as a reducing agent which is very toxic and often must be handled as a high pressure gas so that it cannot be easily conducted. Furthermore, since the facilities are inevitably have a large size, it is technically difficult to be applied to a small size-exhaust gas generation source, especially a moving generation source. Thus, it is also undesirable in an economical aspect.

In the method (c), as in the above-described method (a), a main subject to be treated is a combustion exhaust gas from a gasoline engine of an automobile. This method is difficult to be applied to a treatment of exhaust gases from a diesel engine and the durability of the catalyst is still insufficient. That is, the above-described catalyst comprising a carrier such as alumina or a zeolite having supported thereon a metal such as copper is readily impaired with a sulfur oxide discharged from a diesel engine and the decrease in activity of the catalyst may occur by the aggregation of metals which are active species.

Accordingly, it is earnestly desired to develop a method capable of purifying an exhaust gas by effectively reducing nitrogen oxides in the exhaust gas in the presence of an excess amount of oxygen and even in a case where the gas contains water vapor or a sulfur-oxide.

SUMMARY OF THE INVENTION

The present invention was made so as to respond to such a requirement.

Namely, an object of the present invention is to provide a method for purifying an exhaust gas by effectively reducing nitrogen oxides in the exhaust gas generated from various facilities, i.e., combustion exhaust gases discharged from a gasoline engine and a diesel engine even in an atmosphere where an excess amount of oxygen is present and, furthermore, in the presence of water vapor or a sulfur oxide.

Another object of the present invention is to provide a catalyst for catalytic reduction of nitrogen oxides used in this method.

These and other objects of the present invention have been attained by a reduction purification method of a nitrogen oxide-containing exhaust gas by contacting said nitrogen oxide-containing exhaust gas with a catalyst in an oxidative atmosphere in which an excess amount of oxygen is present and in the presence of at least one reducing agent selected from the group consisting of a hydrocarbon and an oxygen-containing organic compound, wherein said catalyst comprises an alumina having supported thereon (a) tin and
(b) at least one selected from the group consisting of ruthenium, palladium, rhodium and indium.

DETAILED DESCRIPTION OF THE INVENTION

In the present invention, the term "loading amount" means a percentage of parts by weight of metal species (i.e., tin, ruthenium, palladium, rhodium and indium), in terms of a value converted to a metal, supported on 100 parts by weight of alumina. For example, 2% by weight of a loading amount means that 2 parts by weight, in terms of a value converted to a metal, of an active metal species is supported on 100 parts by weight of alumina. In the present invention, ruthenium, palladium and rhodium are sometimes simply referred to as "the VIII group metal(s)".

The method for supporting the above-described metal species (tin and the VIII group metal or indium) on an alumina is not particularly limited. Namely, it can be effected according to conventionally known methods.

For example, tin can be supported on an alumina according to an impregnation method. That is, the alumina is impregnated with an aqueous solution of an appropriate tin compound, the impregnated product thus obtained is dried, and the dried product is calcined in air at a temperature of about 200 to 700° C., preferably about 450 to 600° C., for about 1 to 10 hours to support tin on an alumina.

The above-described tin compounds are not particularly limited. Examples thereof include inorganic salts such as tin (II) chloride, tin (I) chloride, tin (II) sulfate, tin (IV) sulfate, tin (II) nitrate and tin (IV) nitrate, and organic salts such as tin (II) oxalate, tin (II) acetate, hexachloroammonium stannate (IV), hexaethylditin (II) and tetraphenyltin. Among these, generally tin (II) chloride is preferably used. In order to increase the solubility of tin (II) chloride in water, an acid aqueous solution of diluted hydrochloric acid, diluted nitric acid or the like can be added to the aqueous solution.

The loading amount of tin in the catalyst for use in the present invention is generally within a range of 0.1 to 15% by weight, preferably 0.5 to 10% by weight, and more preferably 0.5 to 7% by weight, in terms of a value converted to a metal. When the loading amount of tin. is less than 0.1% by weight, effects as a catalyst, as will be described below, cannot be obtained. On the other hand, when the loading amount of tin is more than 15% by weight, there can be a possibility of blocking off the pores of alumina with tin.

Palladium, ruthenium, rhodium and indium can be supported on an alumina as in the case of tin. That is, the alumina is impregnated with an aqueous solution of an appropriate compound of these metals, the impregnated product thus obtained is dried, and the dried product is calcined in air at a temperature of about 400 to 700° C., preferably about 450 to 600° C., for about 1 to 10 hours to support the above-described metals on the alumina.

Examples of the palladium compound include palladium chloride, tetraamminedichloropalladium, tetraammine dinitropalladium and palladium nitrate. Examples of the ruthenium compound include ruthenium chloride, hexaamminetrichlororuthenium and hexaamminetrinitroruthenium. Examples of the rhodium compound include rhodium chloride, hexaamminetrichlororhodium, hexaamminetrinitrorhodium and rhodium nitrate. Examples of the indium compound include indium nitrate, and indium trichloride.

Palladium, ruthenium, rhodium and indium can be supported on an alumina alone or as a combination of two or more thereof. When palladium or ruthenium is supported on an alumina alone, the loading amount thereof in terms of a value converted to a metal is each generally within a range of 0.0005 to 0.06% by weight, preferably 0.001 to 0.04% by weight, and more preferably 0.002 to 0.03% by weight. Similarly, when rhodium is supported on an alumina alone, the loading amount thereof in terms of a value converted to a metal is generally within a range of 0.00125 to 0.15% by weight, preferably 0.0025 to 0.1% by weight, and more preferably 0.005 to 0.075% by weight.

In a case where two or three kinds of metals selected from the group consisting of palladium, ruthenium and rhodium are combined and supported on alumina, the supported amounts thereof in an alumina catalyst wherein metals are supported preferably are within the range shown by the following formula:

$$0.0005\% \leq [Ru]+[Pd]+(2/5)[Rh] \leq 0.06\%$$

wherein the loading amount (%) of ruthenium, palladium or rhodium is represented as [Ru], [Pd] and [Rh] in terms of a value converted to a metal, respectively.

When the loading amount is too small, the effects as a catalyst, which will be described below, cannot be obtained. On the other hand, when the amount is too large, the VIII group metal excessively accelerates an oxidation reaction of a reducing agent with oxygen to inhibit the reduction of a nitrogen oxide, which will be described below.

The loading amount of indium in terms of a value converted to a metal is generally within a range of 0.1 to 7% by weight, preferably 0.5 to 5% by weight. When the loading amount of indium is less than 0.1% by weight, effects as a catalyst, as will be described below, cannot be obtained. On the other hand, when the loading amount of indium is more than 7% by weight, there can be a possibility of blocking off the pores of alumina with indium.

The preparation method of a catalyst for use in the present invention is not limited to the impregnation method as described above. Namely, the catalyst can be prepared according to any conventionally known method. Examples thereof include an ion exchange method, a co-precipitation method, a kneading method and a deposition method.

In the preparation method of a catalyst as described above, tin, the VIII group metal or indium can be supported on an alumina in any order. The supporting order of these metals does not affect the performance of the resulting catalyst. Also, tin and the VIII group metal or indium can be supported at the same time. Furthermore, tin, the VIII group metal or indium supported on an alumina in such a manner as described above can be in the form of either an oxide or a metal. However, since the catalyst according to the present invention is generally used in an oxygen-excessive atmosphere, it is mostly in the form of an oxide, although other forms can be employed depending upon a temperature at which the catalyst is used.

Thus, according to a catalyst wherein tin and the VIII group metal or indium are supported on an alumina, tin and the VIII group metal or indium act on the active points of alumina to remarkably improve a reduction activity of a nitrogen oxide not only at a low temperature, but also in the co-existence of water vapor and a sulfur oxide. The mechanism of such acceleration effects in the reduction of a nitrogen oxide with tin and the VIII group metal or indium has not been definitely clarified yet. However, the following explanation can be provided.

When, as an exemplification, propylene ($C_3H_6$) as a hydrocarbon which is a reducing agent and nitrogen dioxide ($NO_2$) as a nitrogen oxide are used, the basic reaction in the method of the present invention can be guessed to be the reaction shown in the following formula (1):

$$18NO_2+4C_3H_6 \rightarrow 9N_2+12CO_2+12H_2O \qquad (1)$$

Simultaneously with this reaction, the side reaction shown by the following formula (2) proceeds:

$$9O_2+2C_3H_6 \rightarrow 6CO_2+6H_2O \qquad (2)$$

In order to reduce nitrogen dioxide to nitrogen ($N_2$), propylene is required to be oxidized to carbon dioxide ($CO_2$) (optionally carbon monoxide (CO)) and water ($H_2O$) by nitrogen dioxide. Namely, if the oxidation of propylene by nitrogen dioxide does not proceed, nitrogen is not generated. When the oxidation of propylene proceeds by oxygen ($O_2$) as shown by formula (2), propylene is not involved with the reaction shown by formula (1) so that the reduction ratio of nitrogen dioxide decreases. Accordingly, in order to preserve a high nitrogen oxide conversion, according to formula (1) an oxidation reaction of a hydrocarbon such as propylene and an oxygen-containing organic compound which are a reducing agent of a nitrogen oxide with a nitrogen oxide must proceed. Namely, the reduction reaction of the nitrogen oxide with the reducing agent must proceed.

According to the present invention, by using an alumina catalyst wherein tin and the above-described VIII group metal or indium are supported, such oxidation reaction of the reducing agent with nitrogen dioxide, i.e., the reducing reaction of the nitrogen oxide can be accelerated. The reason why the loading amount of the VIII group metals is extremely small is that these metals are highly reactive to formula (2). Thus, according to the present invention, the loading amount of the VIII group metal on an alumina is strictly controlled as described above. When the loading amount of palladium or ruthenium exceeds 0.06% by weight or when that of rhodium exceeds 0.15% by weight, an oxidation activity of propylene shown in formula (2) is rapidly enhanced so that the reducing reaction of a nitrogen oxide with propylene according to formula (1) is correspondingly decreased.

According to the present invention, an alumina catalyst wherein tin and the above-described VIII group metal or indium are supported on an alumina, of course, has a higher reduction activity of a nitrogen oxide than those of alumina, an alumina catalyst wherein only tin is supported on alumina and an alumina catalyst wherein only a VIII group metal or indium is supported on an alumina. In addition to this property, it should be surprising that although in case of using the alumina catalyst wherein only a VIII group metal or indium is supported on an alumina, the oxidation reaction of the reducing agent mainly proceeds, which is shown in formula (2), by supporting the VIII group metal or indium with tin on an alumina, the reduction reaction of a nitrogen oxide shown by formula (1) preferentially proceeds. As the result, according to the present invention, a noticeable improvement in the catalytic performance can be achieved.

Examples of metals belonging to the VIII group of the periodic table include iridium and platinum in addition to palladium, ruthenium and rhodium. These metals also have a high oxidation activity as in palladium, ruthenium and rhodium. However, if they are supported with tin on an alumina, an acceleration effect in the reduction reaction of a nitrogen oxide cannot be obtained. Namely, in accordance with the present invention, by supporting an extremely small amount of palladium, ruthenium, rhodium or indium together with tin on alumina, a reduction reaction of a nitrogen oxide shown by the above-described formula (1) can be selectively and specifically enhanced to unexpectedly improve catalytic performance to great extent.

In the present invention, a catalyst can be used in any form and structure, for example, in the form of a powder, particle, pellet or honeycomb and the form and structure cannot be limited. Furthermore, the catalyst according to the present invention may be coated on a cordierite or metallic honeycomb. When a catalyst is used after molding, common binders such as polyvinyl alcohol, and lubricants such as graphite, wax, fatty acids and carbon wax can be used in molding.

Examples of nitrogen oxide-containing gas to which the method of the present invention can be applied include exhaust gases discharged from a diesel engine such as a diesel car or a stationary diesel engine, those discharged from a gasoline engine of a gasoline automobile-and those from nitric acid production facilities and various combustion facilities.

Especially, in accordance with the present invention, in a temperature range of an exhaust gas from a diesel engine, an oxidation reaction (2) of a reducing agent as described above is suppressed and a reduction reaction (1) of a nitrogen oxide is accelerated to increase an effective utilization ratio of the reducing agent, i.e., a selectivity, whereby a nitrogen oxide in an exhaust gas can be reduced at a high conversion.

In the present invention, in an oxidative atmosphere in which an excess amount of oxygen is present in the presence of a reducing agent, these exhaust gases are contacted with a catalyst as mentioned above, whereby nitrogen oxides in exhaust gases can be effectively reduced and decomposed.

In the present invention, the oxidative atmosphere in which an excess amount of oxygen is present means an atmosphere wherein an excess amount of oxygen is present compared with the theoretical oxygen amount required to completely oxidize substances to be oxidized with oxygen such as carbon monoxide, hydrogen, hydrocarbons and oxygen-containing organic compounds included in an exhaust gas as well as hydrocarbons and oxygen-containing organic compounds optionally added as reducing agents to an exhaust gas to convert the same to water and carbon dioxide. Accordingly, in case of an exhaust gas discharged from an internal engine of an automobile and the like, the atmosphere is one wherein the air-fuel ratio is large (lean region).

In the present invention, the oxidative atmosphere in which an excess amount of oxygen is present means atmosphere conditions including a larger amount of oxygen than the theoretical oxygen amount. For example, generally, those having 10 to 200,000%, preferably 50 to 200,000%, and more preferably 100 to 200,000%, of oxygen in terms of an excess oxygen ratio are included. The excess oxygen ratio here is defined by the following formula: [(an oxygen amount in an atmosphere–a theoretical oxygen amount)/a theoretical oxygen amount]×100 (%). This excess oxygen ratio can be readily obtained by the calculation using an exhaust gas component composition and an amount of a reducing agent to be added thereto.

In such an oxidative atmosphere, according to the method of the present invention, the above-described catalyst preferentially accelerate the reaction (2) of hydrocarbons and oxygen-containing organic compound with a nitrogen oxide rather than the reaction (1) of the hydrocarbons and the oxygen-containing organic compound with oxygen to reduce and decompose the nitrogen oxide.

In the method of the present invention, a hydrocarbon and an oxygen-containing organic compound which are reducing agents can be those which are originally present in an exhaust gas or can be an imperfect combustion product of a fuel, i.e., particulates, and the like. However, when the amounts are insufficient to cause the reaction shown by the above-described formula (1), it is necessary to externally add a hydrocarbon and an oxygen-containing organic compound.

An amount of a hydrocarbon and an oxygen-containing organic compound for use in the method of the present invention is not particularly limited. For example, when a reduction conversion of a nitrogen oxide required is low, the amount may be less than the theoretical amount required to reduce the nitrogen oxide. However, a reduction reaction can effectively proceed under the conditions wherein a hydrocarbon and an oxygen-containing organic compound are present in a larger amount than the theoretical amount required. Thus, generally, an excess amount of utilization thereof is preferable. Accordingly, a reducing agent, i.e., a hydrocarbon or an oxygen-containing organic compound is preferably used in total in an amount of about 20 to 2,000%, preferably about 30 to 1,500%, excess to the theoretical amount required to reduce and decompose a nitrogen oxide.

In the method of the present invention, the theoretical amount of a reducing agent, i.e., a hydrocarbon or an oxygen-containing organic compound, required for reducing a nitrogen oxide, because of the existence of oxygen in a reaction system, is defined as the amount of the hydrocarbon or the oxygen-containing organic compound required for reducing and decomposing nitrogen dioxide. For example, when propylene is used as a reducing agent, the theoretical amount of the propylene in the reduction and decomposition of 1,000 ppm of nitrogen dioxide ($NO_2$) in the presence of oxygen is 222 ppm. Generally, although depending on an amount of a nitrogen oxide in an exhaust gas, an amount of a hydrocarbon or an oxygen-containing organic compound to be present in a reaction system is about 50 to 10,000 ppm in terms of the methane conversion. The methane conversion used herein means a value obtained by multiplying the amount (ppm) of a hydrocarbon having 2 or more carbon atoms by the carbon number thereof. Accordingly, the methane conversions of 250 ppm of propylene and 200 ppm of benzene are 750 ppm and 1,200 ppm, respectively.

In the present invention, examples of the hydrocarbon include gaseous hydrocarbons such as methane, ethane, ethylene, propane, propylene, butane and butylene and liquid hydrocarbons, for example, pentane, hexane, heptane, octane, octene, benzene, toluene and xylene, and mineral hydrocarbon oils such as gasoline, kerosene, light gas oil and heavy oil.

Furthermore, examples of the oxygen-containing organic compound include alcohols such as methyl alcohol, ethyl alcohol, propyl alcohol, butyl alcohol and octyl alcohol; ethers such as dimethyl ether, ethyl ether and propyl ether; esters such as methyl acetate, ethyl acetate, fats and oils; and ketones such as acetone and methyl ethyl ketone.

In the method of the present invention, these hydrocarbons and oxygen-containing organic compounds can be used alone or as a combination of two or more thereof.

Particularly, in accordance with the present invention, by using an oxygen-containing organic compound as a reducing agent, a temperature region of a high activity of a catalyst can be shifted to a low temperature side. In particular, by using methanol, ethanol or acetone as a reducing agent, a nitrogen oxide can be reduced and eliminated at a high efficiency in a low temperature region. Thus, when an oxygen-containing organic compound, particularly methanol, ethanol or acetone is used as a reducing agent, it is preferable to use a catalyst having a loading amount of 0.1 to 2.5% by weight, preferably 0.2 to 2% by weight, of tin and indium. This is because the consumption of the oxygen-containing organic compound by oxygen according to the reaction of the above-described formula (2) is relatively high on tin and indium.

A noncombustion or imperfect combustion product present in an exhaust gas, i.e., a hydrocarbon, an oxygen-containing organic compound, particulates are effective as reducing agents and are included in the hydrocarbon and the oxygen-containing organic compound according to the present invention. This means that the present invention is effective as a method for decreasing or eliminating a hydrocarbon, an oxygen-containing organic compound and particulates included in an exhaust gas.

Specifically, a reduction elimination reaction of a nitrogen oxide-containing exhaust gas according to the present invention is effected by filling-the above-described catalyst in an appropriate reactor, then introducing an exhaust gas containing a nitrogen oxide into the reactor in an oxidative atmosphere comprising an excess amount of oxygen in the presence of a hydrocarbon or an oxygen-containing organic compound, where the exhaust gas is contacted with the above-described catalyst so that the nitrogen oxide may be reduced, which is then discharged from the reactor.

In the present invention, the temperature in a reducing reaction of a nitrogen oxide in the presence of the above-described catalyst is preferably around the temperature of an exhaust gas because the facilities for heating the exhaust gas are not required. Specifically, although it varies depending upon a kind of a catalyst to be used and a hydrocarbon and an oxygen-containing organic compound which are used as reducing agents, from the above-described point of view, generally, it is preferably 200 to 800° C., especially preferably 250 to 600° C.

A pressure under which such reduction of a nitrogen oxide is effected is not particularly limited. Namely, any pressure such as a higher pressure, ordinary pressure and reduced pressure may be used. Practically, however, it is convenient to introduce an exhaust gas into a reactor at an ordinary evacuation pressure of the exhaust gas where the exhaust gas is contacted with a catalyst to effect a reaction.

The space velocity of an exhaust gas in a reactor is determined by, in addition to a kind of a catalyst to be used, various reaction conditions, a required removal ratio of a nitrogen oxide and the like. Namely, it is not particularly limited. Generally, however, when the VIII group metal is used, the space velocity is from 500 to 500,000 $hr^{-1}$, preferably from 1,000 to 400,000 $hr^{-1}$, and more preferably from 2,000 to 400,000 $hr^{-1}$. When indium is used, the space velocity is from 500 to 100,000 $hr^{-1}$, preferably from 1,000 to 70,000 $hr^{-1}$. Generally, when a high nitrogen oxide removal is desired to be obtained or when a gas to be treated has a low temperature, a small space velocity is advantageous. On the other hand, when a space velocity is large, a conversion decreases and, therefore, a high reaction temperature is advantageous.

When an exhaust gas from an internal engine is treated according to the present invention, it is preferable to arrange the above-described catalyst downstream of an evacuation manifold.

When an exhaust gas is treated according to the method of the present invention, unburned hydrocarbon or oxygen-containing organic compound, or imperfect combustion products which may be a cause of an industrial pollution such as carbon monoxide, can be discharged in the gas to be treated. For overcoming such situation, an exhaust gas containing nitrogen oxides is treated with the above-described catalyst according to the present invention (hereinafter, sometimes referred to as a "catalyst for reduction"), followed by further contacting with an oxidization catalyst to oxidize the above-described imperfect combustion products.

As the above-described oxidization catalyst, generally there can be used any catalyst which can completely burn imperfect combustion products as mentioned above. Usually, can be used those wherein one or two or more active components, i.e., noble metals such as platinum, palladium and ruthenium; oxides of base metals such as lanthanum, cerium, copper, iron and molybdenum; perovskite crystal structures such as cobalt lanthanum trioxide, iron lanthanum trioxide and cobalt strontium trioxide are supported on a porous carrier such as active alumina, silica or zirconia. In such catalysts for oxidization, the loading amount of the above-described active component, in case of a noble metal, is generally from 0.01 to 2% by weight per a carrier. On the other hand, when an oxide of a base metal is used as an active component, generally it is in a range of 5 to 70% by weight to a carrier. The oxide of a base metal also can be used as it is as a catalyst without being supported on a carrier.

The form and structure of such oxidization catalysts are not particularly limited. Namely, they can be used in any form and structure, for example, in the form of a powder, particle, pellet or honeycomb structure. Furthermore, the oxidization catalysts may be coated on a cordierite or metallic honeycomb.

When a nitrogen oxide in an exhaust gas is reduced and removed and generated unburned hydrocarbons and imperfect combustion products such as carbon monoxide are treated by oxidation, the ratio of a catalyst for reduction and an oxidization catalyst is optionally selected and determined depending on properties of the exhaust gas after a reduction treatment of the nitrogen oxide.

When a substance to be oxidized and removed by an oxidation catalyst is an intermediate product in the oxidation of a hydrocarbon such as carbon monoxide, the reduction of the nitrogen oxide and the treatment of the oxidation intermediate can be effected at the same time by mixing a catalyst for reduction and a catalyst for oxidation, then contacting an exhaust gas with the resulting mixed catalysts. Generally, however, it is preferable that a catalyst for reduction is arranged in the side of the upstream of evacuation and a catalyst for oxidation in the side of the downstream, and the exhaust gas is successively treated.

Thus, in accordance with the present invention, a first reactor to which a catalyst for reduction is filled is arranged in an exhaust gas introduction part (former stage), and on the other hand, a second reactor to which a catalyst for oxidation is filled is arranged in an exhaust gas discharging part (latter stage). The exhaust gas is successively introduced into these first and second reactors in which it can be treated. Also, each catalyst can be filled into a single reactor at a ratio corresponding to a required performance.

In any case, the ratio of a catalyst for reduction (A) with a catalyst for oxidation (B) is generally within a range of about from 0.5/9.5 to 9.5/0.5 in terms of an A/B weight ratio.

A temperature at which an oxidation reaction is effected can be different from that of a reduction reaction. Generally, however, it is preferably within a range of a temperature of a reducing reaction in view of a practical use. Accordingly, it is preferable to select a catalyst which can effect an oxidation reaction at such temperatures.

In accordance with the method of the present invention, nitrogen oxides included in an exhaust gas can be effectively reduced and removed in an oxidative atmosphere in which excess oxygen is present even in the presence of water vapor and sulfur oxides and by appropriately selecting reaction conditions, in accordance with a preferable embodiment, nitrogen oxides in an exhaust gas can be substantially reduced and eliminated.

Furthermore, in accordance with the present invention, a tin and the VIII group metal or indium supported alumina catalyst accelerates a moderate oxidation of a reducing agent, i.e., a hydrocarbon or an oxygen-containing organic compound and preferentially accelerates the reaction of these reducing agents with nitrogen oxides rather than with oxygen. Thus, the decrease in activity of the catalyst can be effectively suppressed even in the presence of water vapor and sulfur oxides in an exhaust gas.

As described herein above, in accordance with the method of the present invention, nitrogen oxides included in exhaust gases discharged from a diesel engine and also from various facilities can be stably eliminated at a high conversion.

The present invention will be explained in detail by, but by no means limited to, the following Examples.

EXAMPLES

In Examples 1 to 15 and Comparative Examples 1 to 9, a gas analysis was effected by gas chromatography. A reduction decomposition ratio of nitrogen monoxide was determined by a yield of nitrogen (conversion ratio from nitrogen monoxide to nitrogen). An oxidation ratio of a reducing agent was determined as follows. The amounts of carbon monoxide and carbon dioxide generated under the reaction conditions in which 100% of the oxidation of the reducing agent occurs as well as those generated under each reaction conditions were determined by means of gas chromatograph. By using the values obtained, the oxidation ratio of the reducing agent was determined according to the following formula:

Oxidation ratio of reducing agent (%) =
[(amounts of carbon monoxide and carbon dioxide generated under each reaction conditions)/
(amounts of carbon monoxide and carbon dioxide generated under the reaction conditions in which 100% of the oxidation of reducing agent occurs)]
× 100 (%)

Example 1

Preparation of an Alumina Catalyst Tin/Palladium:

Tin (II) chloride 5-hydrates ($SnCl_4.5H_2O$; 0.588 g) was dissolved in 7 g of distilled water. Then, alumina 10 g (Neobead GB manufactured by Mizusawa Kagaku Kogyo Co., Ltd.) was impregnated with the resulting aqueous solution, and then allowed to stand for 24 hours.

Thereafter, the resulting product was dried under a reduced pressure at 100° C. with an evaporator, followed by calcining in an air stream at 600° C. for 3 hours to prepare an alumina having supported thereon tin in a loading amount of 2.0%.

Dichlorotetraammine palladium 1-hydrate ($Pd(NH_3)_4Cl^2.H_2O$; 1 g) was dissolved in 100 g of distilled water to prepare an aqueous solution. This aqueous solution (0.248 g) was diluted with 7 g of distilled water. Then, the above-described alumina having supported thereon tin was impregnated with this diluted solution, and then allowed to stand for 24 hours.

Thereafter, the resulting product was dried under a reduced pressure at 100° C. with an evaporator, followed by calcining in an air stream at 500° C. for 3 hours to prepare an alumina catalyst wherein 2.0% tin/0.01% Pd were supported.

Reducing Reaction of Nitrogen Oxides:

The thus-prepared alumina catalyst wherein 2% tin/0.01% Pd were supported (0.4 g; about 0.72 ml) was filled in a normal pressure-flowing type reactor and a helium gas containing 1,000 ppm of nitrogen monoxide, 10% by volume of oxygen, 1,000 ppm of propylene and 8% by volume of water vapor was passed at a flow ratio of 120 ml/min to conduct a reaction at a space velocity of 10,000 $hr^{-1}$. Furthermore, a reaction at a reaction gas flow ratio of 600 ml/min and a space velocity of 50,000 $hr^{-1}$ was also conducted. The conversion ratios of nirogen monoxide to nitrogen and the oxidation ratios of reducing agents used are shown in Table 1.

Example 2

Preparation of an Alumina Catalyst wherein Tin/Ruthenium are Supported:

An alumina catalyst wherein 2% tin/0.01% Ru were supported was prepared in the same manner as in Example 1, except that 0.224 g of an aqueous solution provided by dissolving 1 g of ruthenium chloride 3-hydrates ($RuCl_3.3H_2O$) in 100 g of distilled water was used in place of the aqueous dichlorotetraammine palladium solution in Example 1.

Reducing Reaction of Nitrogen Oxides:

A reduction reaction of nitrogen oxides was conducted in the same manner as in Example 1, except that 0.4 g (about 0.72 ml) of the alumina catalyst wherein 2% tin/0.01% Ru were supported thus prepared was used. The results are shown in Table 1.

Example 3
Preparation of an Alumina Catalyst wherein Tin/Rhodium are Supported:

An alumina catalyst wherein 2% tin/0.01% Rh were supported was prepared in the same manner as in Example 1, except that 0.256 g of an aqueous solution provided by dissolving 1 g of rhodium chloride 3-hydrates ($RhCl_3.3H_2O$) in 100 g of distilled water was used in place of the aqueous dichlorotetraammine palladium solution in Example 1.

Reducing Reaction of Nitrogen Oxides:

A reduction reaction of nitrogen oxides was conducted in the same manner as in Example 1, except that 0.4 g (about 0.72 ml) of the alumina catalyst wherein 2% tin/0.01% Rh were supported thus prepared was used. The results are shown in Table 1.

Example 4
Preparation of an Alumina Catalyst wherein Tin/Palladium are Supported:

An alumina catalyst wherein 2% tin/0.02% Pd were supported was prepared in the same manner as in Example 1, except that 0.496 g of an aqueous solution prepared by dissolving 1 g of dichlorotetraammine palladium 1-hydrate in 100 g of distilled water was used.

Reducing Reaction of Nitrogen Oxides:

A reduction reaction of-nitrogen oxides was conducted in the same manner as in Example 1, except that 0.4 g (about 0.72 ml) of the alumina catalyst wherein 2% tin/0.02% Pd were supported thus prepared was used. The results are shown in Table 1.

Example 5
Preparation of an Alumina Catalyst wherein Tin/Ruthenium are Supported:

An alumina catalyst wherein 2% tin/0.02% Ru were supported was prepared in the same manner as in Example 1, except that 0.448 g of an aqueous solution prepared by dissolving 1 g of ruthenium chloride 3-hydrates ($RuCl_3.3H_2O$) in 100 g of distilled water was used in place of the aqueous dichlorotetraammine palladium solution in Example 1.

Reducing Reaction of Nitrogen Oxides:

A reduction reaction of nitrogen oxides was conducted in the same manner as in Example 1, except that 0.4 g (about 0.72 ml) of the alumina catalyst wherein 2% tin/0.02% Ru were supported thus prepared was used. The results are shown in Table 1.

Example 6
Preparation of an Alumina Catalyst wherein Tin/Rhodium are Supported:

An alumina catalyst wherein 2% tin/0.02% Rh were supported was prepared in the same manner as in Example 1, except that 0.512 g of an aqueous solution prepared by dissolving 1 g of rhodium chloride 3-hydrates ($RhCl_3.3H_2O$) in 100 g of distilled water was used in place of the aqueous dichlorotetraammine palladium solution in Example 1.

Reducing Reaction of Nitrogen Oxides:

A reduction reaction of nitrogen oxides was conducted in the same manner as in Example 1, except that 0.4 g (about 0.72 ml) of the alumina catalyst wherein 2% tin/0.02% Rh were supported thus prepared was used. The results are shown in Table 1.

Example 7
Preparation of an Alumina Catalyst wherein Tin/Rhodium are Supported:

An alumina catalyst wherein 2% tin/0.05% Rh were supported was prepared in the same manner as in Example 1, except that 1.280 g of an aqueous solution prepared by dissolving 1 g of rhodium chloride 3-hydrates ($RhCl_3.3H_2O$) in 100 g of distilled water was used in place of the aqueous dichlorotetraammine palladium solution in Example 1.

Reducing Reaction of Nitrogen Oxides:

A reduction reaction of nitrogen oxides was conducted in the same manner as in Example 1, except that 0.4 g (about 0.72 ml) of the alumina catalyst wherein 2% tin/0.05% Rh were supported thus prepared was used. The results are shown in Table 1.

TABLE 1

| Example | | Space Velocity | Conversion of Nitrogen Monoxide to Nitrogen (%) | | | | Oxidation Ratio Rate of Reducing Agent (%) | | | |
| --- | --- | --- | --- | --- | --- | --- | --- | --- | --- | --- |
| No. | Catalyst | ($hr^{-1}$) | 350° C. | 400° C. | 450° C. | 500° C. | 350° C. | 400° C. | 450° C. | 500° C. |
| 1 | 2% Sn/0.01% Pd | 10000 | 63 | 84 | 80 | 50 | 43 | 98 | 100 | 100 |
|   |                | 50000 | 20 | 44 | 78 | 65 | 18 | 60 | 89  | 100 |
| 2 | 2% Sn/0.01% Ru | 10000 | 67 | 89 | 92 | 55 | 36 | 62 | 90  | 100 |
| 3 | 2% Sn/0.01% Rh | 10000 | 70 | 100 | 100 | 97 | 34 | 62 | 92 | 100 |
| 4 | 2% Sn/0.02% Pd | 10000 | 69 | 87 | 52 | 38 | 63 | 100 | 100 | 100 |
| 5 | 2% Sn/0.02% Ru | 10000 | 68 | 85 | 60 | 43 | 65 | 99 | 100 | 100 |
| 6 | 2% Sn/0.02% Rh | 10000 | 64 | 100 | 91 | 81 | 51 | 83 | 100 | 100 |
| 7 | 2% Sn/0.05% Rh | 10000 | 66 | 100 | 85 | 70 | 68 | 96 | 100 | 100 |

Reducing agent: propylene (about 1,000 ppm)

As shown in Table 1, by using an alumina catalyst wherein 2% tin is supported together with a very small amount of the VIII group metal, nitrogen monoxide can be reduced and eliminated at a very high efficiency in an atmosphere comprising water vapor.

Comparative Examples 1 to 5
Preparation of an Alumina Catalyst wherein Tin is Supported:

Tin (II) chloride 5-hydrates ($SnCl_4.5H_2O$; 0.588 g) was dissolved in 7 g of distilled water. Then, 10 g of alumina (Neobead GB) was impregnated with the resulting aqueous solution, and then allowed to stand for 24 hours. Thereafter, the resulting product was dried under a reduced pressure at 100° C. with an evaporator, followed by calcining in air stream at 600° C. for 3 hours to prepare an alumina catalyst wherein 2% tin was supported.

Preparation of an Alumina Catalyst wherein Palladium is Supported:

Dichlorotetraammine palladium 1-hydrate (1 g) was dissolved in 100 g of distilled water to prepare an aqueous solution. This aqueous solution (0.248 g) was diluted with 7 g of distilled water. Then, 10 g of alumina (Neobead GB) was impregnated with this diluted solution, and then allowed to stand for 24 hours. Thereafter, the resulting product was dried under a reduced pressure at 100° C. with an evaporator, followed by calcining in air stream at 500° C. for 3 hours to prepare an alumina catalyst wherein 0.01% Pd was supported.

Preparation of an Alumina Catalyst wherein Ruthenium is supported:

An alumina catalyst wherein 0.01% Ru was supported was prepared in the same manner as described above, except that 0.224 g of an aqueous solution prepared by dissolving 1 g of ruthenium chloride 3-hydrates ($RuCl_3.3H_2O$) in 100 g of distilled water was used in place of the aqueous dichlorotetraammine palladium solution.

Preparation of an Alumina Catalyst wherein Rhodium is Supported:

An alumina catalyst wherein 0.01% Rh was supported was prepared in the same manner as described above, except that 0.256 g of an aqueous solution prepared by dissolving 1 g of rhodium chloride 3-hydrates ($RhCl_3.3H_2O$) in 100 g of distilled water was used in place of the aqueous dichlorotetraammine palladium solution.

Reducing Reaction of Nitrogen Oxides:

A reduction reaction of nitrogen monoxide was conducted in the same manner as in Example 1 using, as a catalyst, each alumina catalyst prepared according to the above-described method or alumina alone.

exist together in an alumina, a high reduction decomposition ratio of a nitrogen oxide can be realized.

Comparative Example 6

Preparation of an Alumina Catalyst wherein Tin/Iridium are Supported:

An alumina catalyst wherein 2% tin/0.01% Ir were supported was prepared in the same manner as in Example 1, except that 0.168 g of an aqueous solution prepared by dissolving 1 g of iridium chloride 5-hydrates ($IrCl_3.5H_2O$) in 100 g of distilled water was used in place of the aqueous dichlorotetraammine palladium solution in Example 1.

Reducing Reaction of Nitrogen Oxides:

A reduction reaction of nitrogen oxides was conducted in the same manner as in Example 1, except that 0.4 g (about 0.72 ml) of the alumina catalyst wherein 2% tin/0.01% Ir were supported thus prepared was used. The results are shown in Table 3.

Comparative Example 7

Preparation of an Alumina Catalyst wherein Tin/Platinum are Supported:

An alumina catalyst wherein 2% tin/0.01% Pt were supported was prepared in the same manner as in Example 1, except that 0.528 g of an aqueous solution prepared by dissolving 1 g of platinum chloride 6-hydrates ($H_2PtCl_6.6H_2O$) in 100 g of distilled water was used in place of the aqueous dichlorotetraammine palladium solution in Example 1.

TABLE 2

| Example No. | Catalyst | Space Velocity ($hr^{-1}$) | Conversion of Nitrogen Monoxide to Nitrogen (%) | | | | Oxidation Ratio Rate of Reducing Agent (%) | | | |
|---|---|---|---|---|---|---|---|---|---|---|
| | | | 350° C. | 400° C. | 450° C. | 500° C. | 350° C. | 400° C. | 450° C. | 500° C. |
| 1 | 2% Sn | 10000 | 46 | 71 | 84 | 74 | 27 | 45 | 81 | 100 |
| | | 50000 | 9 | 20 | 32 | 41 | 5 | 11 | 28 | 56 |
| 2 | 0.01% Pd | 10000 | 35 | 70 | 78 | 68 | 33 | 97 | 100 | 100 |
| | | 50000 | 8 | 16 | 27 | 18 | 10 | 89 | 100 | 100 |
| 3 | 0.01% Ru | 10000 | 43 | 46 | 69 | 59 | | | | |
| 4 | 0.01% Rh | 10000 | 44 | 43 | 40 | 16 | | | | |
| 5 | (Alumina) | 10000 | 37 | 61 | 69 | | | | | |

Reducing agent: propylene (about 1,000 ppm)

As shown in Table 2, any performances of the catalysts in Comparative Examples 1 to 5 is lower than those of alumina catalysts containing tin/VIII group metals shown in the above-described Examples 1 to 7. By supporting the VIII group metal on an alumina, the catalytic performance of alumina itself often may be decreased. According to the present invention, by making the VIII group metal and tin Reducing Reaction of Nitrogen Oxides:

A reduction reaction of nitrogen oxides was conducted in the same manner as in Example 1, except that 0.4 g (about 0.72 ml) of the alumina catalyst wherein 2% tin/0.01% Pt were supported thus prepared was used. The results are shown in Table 3.

TABLE 3

| Comparative Example No. | Catalyst | Space Velocity ($hr^{-1}$) | Conversion of Nitrogen Monoxide to Nitrogen (%) | | | |
|---|---|---|---|---|---|---|
| | | | 350° C. | 400° C. | 450° C. | 500° C. |
| 6 | 2% Sn/0.01% Ir | 10000 | | 66 | 69 | 60 |
| 7 | 2% Sn/0.01% Pt | 10000 | 0 | 0 | 0 | 0 |

Reducing agent: propylene (about 1,000 ppm)

As shown in Table 3, reduction activities of a nitrogen oxide of the catalysts in Comparative Examples 6 and 7 are in the same manner as in Example 1. The results are shown in Table 5.

TABLE 5

| | Catalyst | Space Velocity (hr$^{-1}$) | Conversion of Nitrogen Monoxide to Nitrogen (%) | | | | Oxidation Ratio Rate of Reducing Agent (%) | | | |
|---|---|---|---|---|---|---|---|---|---|---|
| | | | 350° C. | 400° C. | 450° C. | 500° C. | 350° C. | 400° C. | 450° C. | 500° C. |
| Ex. 9 | 5% Sn/0.01% Pd | 10000 | 65 | 84 | 75 | 50 | 50 | 98 | 100 | 100 |
| | | 50000 | 20 | 63 | 84 | 68 | 18 | 67 | 100 | 100 |
| Comp. Ex. 9 | 5% Sn | 10000 | 48 | 80 | 82 | 58 | 41 | 57 | 94 | 100 |
| | | 50000 | 12 | 28 | 30 | 33 | 10 | 16 | 43 | 84 |

Reducing agent: propylene (about 1,000 ppm)

lower than that of the above-described alumina catalyst wherein 2% tin was supported (Comparative Example 1). Thus, it is shown that by supporting iridium or platinum on the alumina wherein tin is supported, the reduction activity of a nitrogen oxide cannot be improved at all. Especially, the alumina catalyst wherein platinum is supported together with tin substantially has no reduction activity of a nitrogen oxide.

Example 8

The reduction reaction of a nitrogen oxide was conducted in the same manner as in Example 1, except that 1,000 ppm of propane was used in place of propylene as a reducing agent. The results are shown in Table 4.

Comparative Example 8

The reduction reaction of a nitrogen oxide is conducted in the same manner as in Comparative Example 1, except that 1,000 ppm of propane was used in place of propylene as a reducing agent. The results are shown in Table 4.

TABLE 4

| | Catalyst | Space Velocity (hr$^{-1}$) | Conversion of Nitrogen Monoxide to Nitrogen (%) | | | |
|---|---|---|---|---|---|---|
| | | | 425° C. | 450° C. | 475° C. | 500° C. |
| Ex. 8 | 2% Sn/ 0.01% Pd | 10000 | | 49 | 73 | 90 |
| Comp. Ex. 8 | 2% Sn | 10000 | 0 | 28 | 49 | 62 |

Reducing agent: propane (about 1,000 ppm)

As shown in Table 4, the alu/m/nina catalyst wherein 2% tin/0.01% Pd are supported (Example 8) has a higher activity than that of the alumina catalyst wherein 2% tin is supported (Comparative Example 8) in case of using not only propylene but also propane as a reducing agent.

Example 9

An alumina catalyst wherein 5% tin/0.01% Pd were supported was prepared in the same manner as in Example 1 and a reduction reaction of a nitrogen oxide was conducted in the same manner as in Example 1. The results are shown in Table 5.

Comparative Example 9

An alumina catalyst wherein 5% tin was supported was prepared in the same manner as in Comparative Example /I and a reduction reaction of a nitrogen oxide was conducted As shown in Table 5, the alumina catalyst wherein 5% tin/0.01% Pd are supported (Example 9) shows a nitrogen monoxide conversion ratio similar to that of the alumina catalyst wherein 5% tin is supported (Comparative Example 9) at a space velocity of 10,000 hr$^{-1}$. On the other hand, at a space velocity of 50,000 hr$^{-1}$, the former has a higher reduction activity to a nitrogen oxide than that of the latter.

Example 10

Preparation of an Alumina Catalyst wherein Tin/Palladium are Supported:

A reduction reaction of a nitrogen oxide was conducted in the same manner as in Example 1, except that 0.4 g (about 0.72 ml) of the alumina catalyst wherein 2% tin/0.05% Pd were supported prepared in the same manner as in Example 1 was used. The results are shown in Table 6.

Example 11

Preparation of an Alumina Catalyst wherein Tin/Ruthenium are Supported:

A reduction reaction of a nitrogen oxide was conducted in the same manner as in Example 5, except that 0.4 g (about 0.72 ml) of the alumina catalyst wherein 2% tin/0.05% Ru were supported prepared in the same manner as in Example 5 was used. The results are shown in Table 6.

Example 12

Preparation of an Alumina Catalyst wherein Tin/Rhodium are Supported:

A reduction reaction of a nitrogen oxide was conducted in the same manner as in Example 3, except that 0.4 g (about 0.72 ml) of the alumina catalyst wherein 2% tin/0.10% Rh were supported prepared in the same manner as in Example 3 was used. The results are shown in Table 6.

Example 13

Preparation of an Alumina Catalyst wherein Tin/Palladium are Supported:

A reduction reaction of a nitrogen oxide was conducted in the same manner as in Example 3, except that 0.4 g (about 0.72 ml) of the alumina catalyst wherein 2% tin/0.0005% Pd were supported prepared in the same manner as in Example 3 was used. The results are shown in Table 6.

Example 14

Preparation of an Alumina Catalyst wherein Tin/Ruthenium are Supported:

A reduction reaction of a nitrogen oxide was conducted in the same manner as in Example 2, except that 0.4 g (about 0.72 ml) of the alumina catalyst wherein 2% tin/0.0005% Ru were supported prepared in the same manner as in Example 2 was used. The results are shown in Table 6.

Example 15
Preparation of an Alumina Catalyst wherein Tin/Palladium are Supported:

A reduction reaction of a nitrogen oxide was conducted in the same manner as in Example 1, except that 0.4 g (about 0.72 ml) of the alumina catalyst wherein 10% tin/0.01% Pd were supported prepared in the same manner as in Example 1 was used. The results are shown in Table 6.

Reducing Reaction of Nitrogen Oxides:

The alumina catalyst wherein 3% tin/(0.03% Ru and 0.01% Rh) were supported thus prepared (67 g; 120 ml) was filled in an ordinary pressure-flowing type reactor. An exhaust gas from a diesel engine using kerosine comprising about 5 ppm of sulfur as a fuel (Nisssan Diesel Engine: direct injection type 4-cylinder engine 4200 cc) was partially ramified at about 1/10 scale so that the discharging amount of

TABLE 6

| Example No. | Catalyst | Space Velocity ($hr^{-1}$) | Conversion of Nitrogen Monoxide to Nitrogen (%) | | | | | Oxidation Ratio Rate of Reducing Agent (%) | | | | |
| --- | --- | --- | --- | --- | --- | --- | --- | --- | --- | --- | --- | --- |
| | | | 325° C. | 350° C. | 400° C. | 450° C. | 500° C. | 325° C. | 350° C. | 400° C. | 450° C. | 500° C. |
| 10 | 2% Sn/0.05% Pd | 10000 | 81 | 42 | 24 | 15 | 11 | 98 | 100 | 100 | 100 | 100 |
| | | 50000 | 33 | 50 | 61 | 47 | 21 | 54 | 61 | 97 | 100 | 100 |
| 11 | 2% Sn/0.05% Ru | 10000 | 81 | 40 | 18 | 14 | 5 | 97 | 100 | 100 | 100 | 100 |
| 12 | 2% Sn/0.10% Rh | 10000 | 80 | 38 | 15 | 8 | 0 | 97 | 100 | 100 | 100 | 100 |
| 13 | 2% Sn/0.0005% Pd | 10000 | | 46 | 68 | 80 | 69 | | | | | |
| 14 | 2% Sn/0.0005% Ru | 10000 | | 46 | 65 | 79 | 71 | | | | | |
| 15 | 10% Sn/0.01% Pd | 10000 | | 38 | 60 | 45 | 36 | | 45 | 78 | 100 | 100 |
| | | 50000 | | 12 | 20 | 63 | 51 | | 15 | 28 | 81 | 100 |

Reducing agent: propylene (about 1,000 ppm)

In the above-described Examples 10 to 12, at a space velocity of 10,000 $hr^{-1}$, the higher a reaction temperature is, the lower a nitrogen monoxide conversion ratio is. Particularly, at a temperature range of 350° C. or more, the decrease in the nitrogen monoxide conversion ratio is noticeable. This is because at such a high temperature range, the oxidation ratio of a reducing agent already has reached 100% and, therefore, further increase in the temperature promotes a reaction for consuming the reducing agent according to the above-described formula (2), i.e., an oxidation reaction of the reducing agent, rather than a reduction reaction of a nitrogen oxide according to the above-described formula (1), which may lead the shortage of the reducing agent required for the reducing reaction of the nitrogen oxide in a system so that a nitrogen monoxide conversion ratio further decreases.

Example 16
Preparation of an Alumina Catalyst wherein Tin/Ruthenium and Rhodium are Supported:

Tin (II) chloride 5-hydrates ($SnCl_4.5H_2O$; 8.86 g) was dissolved in 70 g of distilled water. Then, 100 g of alumina in the form of pellets (diameter: 2 to 3 mm) was impregnated with the resulting aqueous solution, and then allowed to stand for 24 hours.

Thereafter, the resulting product was dried under a reduced pressure at 100° C. with an evaporator, followed by calcining in air stream at 600° C. for 3 hours to prepare an alumina catalyst wherein 3.0% tin was supported.

An aqueous solution (7.77 g) prepared by dissolving 1 g of ruthenium chloride 3-hydrates ($RuCl_3.3H_2O$) in 100 g of distilled water and 2.56 g of an aqueous solution prepared by dissolving 1 g of rhodium chloride 3-hydrates ($RhCl_3.3H_2O$) in 100 g of distilled water were mixed with each other, the resulting mixture was diluted with 70 g of distilled water. Then the above-described alumina wherein tin was supported was impregnated with the resulting diluted mixture, and then allowed to stand for 24 hours.

Thereafter, the resulting product was dried under a reduced pressure at 100° C. with an evaporator, followed by calcining in air stream at 500° C. for 3 hours to prepare an alumina wherein 3% tin/(0.03% Ru and 0.01% Rh) were supported.

the exhaust gas might be 200 l/min, with which kerosine, as a reducing agent, was mixed at 0.6 ml/min. The resulting mixture was introduced into the above-described reactor, in which nitrogen oxides included in the exhaust gas were reduced to prepare a purified gas.

The operation conditions of the above-described diesel engine and the composition of the exhaust gas discharged therefrom are shown in Table 7. Nitrogen oxides in the exhaust gas were analyzed by a chemical luminescent nitrogen oxide analyzer. Also, nitrogen oxides included in the purified gas were similarly analyzed thereby to determine a conversion of the nitrogen oxides. The results are shown in Table 8.

TABLE 7

| Diesel engine operation conditions | |
| --- | --- |
| Revolution number (rpm) | 1300 |
| Load (kg · m) | 15 |
| Exhaust gas composition | |
| Nitrogen oxide (ppm) | 500 |
| Oxygen (% by volume) | 13 |
| Water (% by volume) | 8 |
| Total hydrocarbon (ppm) | 350 |
| Sulfur oxide (ppm) | 0.3 |
| Exhaust gas amount | 200 l/min[1] |
| Reducing agent (kerosine[2]) | 300 ppm |

(Note)
[1] partially ramified real exhaust gas, about 1/10 scale
[2] containing about 50 ppm of sulfur

Example 17
Preparation of an Alumina Catalyst wherein Tin/Palladium are Supported:

An alumina catalyst wherein 8% tin/(0.02% Pd and 0.01% Rh) were supported was prepared in the same manner as in Example 16, except that 23.6 g of tin (II) chloride 5-hydrates was used and 4.96 g of an aqueous solution prepared by dissolving 1 g of dichlorotetraammine palladium 1-hydrate ($Pd(NH_3)_4Cl_2.H_2O$) in 100 g of distilled water was used in place of the aqueous solution of ruthenium chloride 3-hydrates.

Reducing Reaction of Nitrogen Oxides:

A reduction reaction of nitrogen oxides in the exhaust gas discharged from a diesel engine was conducted in the same manner as in Example 16 except for using the alumina catalyst wherein 8% tin/(0.02% Pd and 0.01% Rh) were supported thus prepared. The results are shown in Table 8.

Example 18
Preparation of an Alumina Catalyst wherein Tin/Rhodium are Supported:

An alumina catalyst wherein 10% tin/0.005% Rh were supported was prepared in the same manner as in Example 16, except that 29.53 g of tin (II) chloride 5-hydrates was used and 1.28 g of an aqueous solution prepared by dissolving 1 g of rhodium chloride in 100 g of distilled water was used in place of the mixed aqueous solution of ruthenium chloride and rhodium chloride.
Reducing Reaction of Nitrogen Oxides:

A reduction reaction of nitrogen oxides in the exhaust gas discharged from a diesel engine was conducted in the same manner as in Example 16, except for using the alumina catalyst wherein 10% tin/0.005% Rh were supported thus prepared. The results are shown in Table 8.

Example 19
Preparation of an Alumina Catalyst wherein Tin/Palladium are Supported:

An alumina catalyst wherein 2% tin/0.01% Pd were supported was prepared in the same manner as in Example 16, except that 5.91 g of tin (II) chloride 5-hydrates was used and 2.48 g of an aqueous solution prepared by dissolving 1 g of dichlorotetraammine palladium in 100 g of distilled water was used in place of the mixed aqueous solution of ruthenium chloride and rhodium chloride.
Reducing Reaction of Nitrogen Oxides:

A reduction reaction of nitrogen oxides in the exhaust gas discharged from a diesel engine was conducted in the same manner as in Example 16, except for using the alumina catalyst wherein 2% tin/0.01% Pd were supported thus prepared. The results are shown in Table 8.

Example 20

A reduction reaction of nitrogen oxides in the exhaust gas discharged from a diesel engine was conducted in the same manner as in Example 16, except for using 48 g (about 86 ml) of the catalyst prepared in Example 17. The results are shown in Table 8.

Example 21

A reduction reaction of nitrogen oxides in the exhaust gas discharged from a diesel engine was conducted in the same manner as in Example 16, except for using 168 g (about 300 ml) of the alumina catalyst wherein 8% tin/(0.02% Pd and 0.01% Rh) were supported prepared in Example 17. The results are shown in Table 8.

Comparative Example 10

Preparation of an Alumina Catalyst wherein Tin is Supported:

Tin (II) chloride 5-hydrates (59.07 g) was dissolved in 70 g of distilled water. Then, 100 g of alumina in the form of pellets (diameter 2 to 3 mm) was impregnated with the resulting aqueous solution, and then allowed to stand for 24 hours. Thereafter, the resulting product was dried under a reduced pressure at 100° C. with an evaporator, followed by calcining in air stream at 600° C. for 3 hours to prepare an alumina catalyst wherein 20% tin was supported.
Reducing Reaction of Nitrogen Oxides:

A reduction reaction of nitrogen oxides in the exhaust gas discharged from a diesel engine was conducted in the same manner as in Example 16, except for using the alumina catalyst wherein 20% tin was supported thus prepared. The results are shown in Table 9.

Comparative Example 11
Preparation of an Alumina Catalyst wherein Palladium is Supported:

An aqueous solution (17.36 g) prepared by dissolving 1 g of dichlorotetraammine palladium 1-hydrate in 100 g of distilled water was diluted with 70 g of distilled water. Successively, 100 g of alumina in the form of pellets (diameter 2 to 3 mm) was impregnated with the resulting aqueous solution, and then allowed to stand for 24 hours. Thereafter, the resulting product was dried under a reduced pressure at 100° C. with an evaporator, followed by calcining in air stream at 500° C. for 3 hours to prepare an alumina catalyst wherein 0.07% Pd was supported.
Reducing Reaction of Nitrogen Oxides:

A reduction reaction of nitrogen oxides in the exhaust gas discharged from a diesel engine was conducted in the same manner as in Example 16, except for using the alumina catalyst wherein 0.07% Pd was supported thus prepared. The results are shown in Table 9.

Comparative Example 12

A reduction reaction of nitrogen oxides in the exhaust gas discharged from a diesel engine was conducted in the same manner as in Example 16, except for using the alumina alone used in Example /1L6 as the catalyst. The results are shown in Table 9.

TABLE 8

| Example No. | Catalyst Component (loading amount %) | | | | Catalyst Amount (g) | Space Velocity $(hr^{-1})$ | Nitrogen Oxide Conversion (%) | | | |
|---|---|---|---|---|---|---|---|---|---|---|
| | Sn | Pd | Ru | Rh | | | 450° C. | 500° C. | 550° C. | 600° C. |
| 16 | 3 | | 0.03 | 0.01 | 67 | 100000 | 31 | 57 | 60 | 50 |
| 17 | 8 | 0.02 | | 0.01 | 67 | 100000 | 47 | 68 | 62 | 45 |
| 18 | 10 | | | 0.005 | 67 | 100000 | 20 | 35 | 48 | 32 |
| 19 | 2 | 0.01 | | | 67 | 100000 | 22 | 43 | 50 | 40 |
| 20 | 8 | 0.02 | | 0.01 | 48 | 140000 | 35 | 55 | 58 | 40 |
| 21 | 8 | 0.02 | | 0.01 | 168 | 40000 | 79 | 93 | 90 | 76 |

TABLE 9

| Example No. | Catalyst Component (loading amount %) | | | | Catalyst Amount (g) | Space Velocity (hr$^{-1}$) | Nitrogen Oxide Conversion (%) | | | |
|---|---|---|---|---|---|---|---|---|---|---|
| | Sn | Pd | Ru | Rh | | | 450° C. | 500° C. | 550° C. | 600° C. |
| 10 | 20 | | | | 67 | 100000 | 5 | 12 | 13 | 10 |
| 11 | | 0.07 | | | 67 | 100000 | 12 | 7 | 5 | 3 |
| 12[1)] | | | | | 67 | 100000 | 6 | 10 | 15 | 18 |

(Note) [1)]As a catalyst, the same alumina as that used in Example 16 was only used.

Example 22
Preparation of an Alumina Catalyst wherein Tin/Indium are Supported:

Tin (II) chloride 5-hydrates ($SnCl_4 \cdot 5H_2O$; 0.588 g) was dissolved in 7 g of distilled water. Then, 10 g of alumina (Neobead GB) was impregnated with the resulting aqueous solution, and then allowed to stand for 24 hours.

Thereafter, the resulting product was dried under a reduced pressure at 100° C. with an evaporator, followed by calcining in air stream at 600° C. for 3 hours to prepare alumina wherein 2.0% tin was supported.

Dichlorotetraammine indium nitrate 3-hydrates ($In(NO_3)_3 \cdot 3H_2O$; 0.308 g) was dissolved in 7 g of distilled water to prepare an aqueous solution. Then, the above-described alumina wherein tin was supported was impregnated with this aqueous solution, and then allowed to stand for 24 hours. Thereafter, the resulting product was dried under a reduced pressure at 100° C. with an evaporator, followed by calcining in air stream at 600° C. for 3 hours to prepare alumina wherein 2% tin/1% In were supported.

Reducing Reaction of Nitrogen Oxides:

The alumina catalyst wherein 2% tin/1% In were supported (0.4 g) was filled in an ordinary pressure-flowing type reactor and a helium gas containing 1,000 ppm of nitrogen monoxide, 10% by volume of oxygen, 1,000 ppm of propylene and 8% by volume of water vapor was passed at a flow ratio of 120 ml/min to conduct a reaction.

The gas analysis was conducted by gas chromatography and the reduction decomposition ratio of nitrogen monoxide was determined from the yield of nitrogen (conversion ratios of carbon monoxide to nitrogen). The results are shown in Table 10.

Example 23
Preparation of an Alumina Catalyst wherein Tin/Indium are Supported as Well as Reduction of a Nitrogen Oxide:

An alumina catalyst wherein 2% tin/2% In were supported was prepared in the same manner as in Example 22. A reduction reaction of a nitrogen oxide was conducted in the same manner as in Example 22, except for using 0.4 g of this catalyst. The results are shown in Table 10.

Example 24
Preparation of an Alumina Catalyst wherein Tin/Indium Were Supported as Well as Reduction of a Nitrogen Oxide:

An alumina catalyst wherein 2% tin/5% In were supported was prepared in the same manner as in Example 22. A reduction reaction of a nitrogen oxide was conducted in the same manner as in Example 22, except for using 0.4 g of this catalyst. The results are shown in Table 10.

Example 25
Preparation of an Alumina Catalyst wherein Tin/Indium Were Supported as Well as Reduction of a Nitrogen Oxide:

An alumina catalyst wherein 5% tin/1% In were supported was prepared in the same manner as in Example 22. A reduction reaction of a nitrogen oxide was conducted in the same manner as in Example 22, except for using 0.4 g of this catalyst. The results are shown in Table 10.

Example 26
A reduction reaction of a nitrogen oxide was conducted in the same manner as in Example 22, except that 2,000 ppm of methanol was used as a reduction agent in place of propylene in Example 22. The results are shown in Table 10.

Example 27
A reduction reaction of a nitrogen oxide was conducted in the same manner as in Example 25, except that 2,000 ppm of methanol was used as a reduction agent in place of propylene in Example 25. The results are shown in Table 10.

TABLE 10

| Example No. | Catalyst | Conversion of Nitrogen Monoxide to Nitrogen (%) | | | | | |
|---|---|---|---|---|---|---|---|
| | | 250° C. | 300° C. | 350° C. | 400° C. | 450° C. | 500° C. |
| 22 | 2% Sn/1% In | | | 51 | 80 | 90 | 78 |
| 23 | 2% Sn/2% In | | | 58 | 91 | 95 | 79 |
| 24 | 2% Sn/5% In | | | 59 | 100 | 100 | |
| 25 | 5% Sn/1% In | | | 56 | 82 | 89 | |
| 26 | 2% Sn/1% In | 35 | 57 | 42 | 31 | | |
| 27 | 5% Sn/1% In | 44 | 58 | 38 | 29 | | |

Reducing agent:

In Examples 22 to 25, propylene (about 1,000 ppm) is used, and in Examples 26 and 27, methanol (about 2,000 ppm) is used.

As can be seen from Table 10, the alumina catalyst wherein tin/indium were supported according to the present invention can reduce and eliminate a nitrogen oxide at a high efficiency in an atmosphere in which water vapor is present when either propylene or methanol is used as a reducing agent.

Comparative Example 13

Preparation of an Alumina Catalyst wherein Indium is Supported:

Indium nitrate 3-hydrates ($In(NO_3)_3 \cdot 3H_2O$; 0.616 g) was dissolved in 7 g of distilled water to prepare an aqueous solution. Then, 10 g of alumina (Neobead GB) was impregnated with the resulting aqueous solution, and then allowed to stand for 24 hours. Thereafter, the resulting product was dried under a reduced pressure at 100° C. with an evaporator, followed by calcining in air stream at 600° C. for 3 hours to prepare an alumina catalyst wherein 2% In is supported.

Reducing Reaction of Nitrogen Oxides:

A reduction reaction of nitrogen oxides was conducted in the same manner as in Example 22, except that the alumina catalyst prepared according to the above-described method or alumina alone as a catalyst was used. The results are shown in

TABLE 11

| Comparative Example No. | Catalyst | Conversion of Nitrogen Monoxide to Nitrogen (%) | | | |
|---|---|---|---|---|---|
| | | 350° C. | 400° C. | 450° C. | 500° C. |
| 13 | 2% In | 50 | 67 | 72 | 59 |

Reducing agent: propylene (about 1,000 ppm)

As can be seen from Table 11, the catalyst of Comparative Example 13 has a lower reduction activity of a nitrogen oxide than catalysts containing tin/indium shown in the above-described Examples 22 to 25. According to the present invention, by supporting indium and tin on alumina, a specifically high catalytic performance can be developed.

While the invention has been described in detail and with reference to specific embodiments thereof, it will be apparent to one skilled in the art that various changes and modifications can be made therein without departing from the spirit and scope thereof.

This application is based on application Nos. Hei 7-339402, 7-339403 and 8-268928 filed in Japan, the content of which is incorporated hereinto by reference.

What is claimed is:

1. A reduction purification method for a nitrogen oxide-containing exhaust gas by contacting said nitrogen oxide-containing exhaust gas with a catalyst in an oxidative atmosphere in which an excess amount of oxygen is present and in the presence of at least one reducing agent selected from the group consisting of a hydrocarbon and an oxygen-containing organic compound, wherein said catalyst consists essentially of an alumina having supported thereon (a) tin metal or tin oxides, and
   (b) indium metal or indium oxides, wherein the indium is supported in the catalyst in an amount of 0.1 to 7 percent by weight indium metal based on alumina amount.

2. The method as claimed in claim 1, wherein the tin metal or the tin oxides are supported in the catalyst in an amount of 0.1 to 15% by weight tin metal based on alumina amount.

3. The method as claimed in claim 1, wherein the hydrocarbon is selected from the group consisting of methane, ethane, ethylene, propane, propylene, butane, butylene, pentane, hexane, heptane, octane, octene, benzene, toluene, xylene, gasoline, kerosine, light gas oil and heavy oil.

4. The method as claimed in claim 1, wherein the oxygen-containing organic compound is selected from the group consisting of methyl alcohol, ethyl alcohol, propyl alcohol, butyl alcohol, octyl alcohol, dimethyl ether, ethyl ether, propyl ether, methyl acetate, ethyl acetate, fats and oils, acetone and methyl ethyl ketone.

* * * * *